W. C. BAER.
TRACTOR.
APPLICATION FILED MAR. 29, 1916.

1,234,604.

Patented July 24, 1917.
2 SHEETS—SHEET 1.

Inventor
Walter Charles Baer
by
Owen, Owen & Crampton

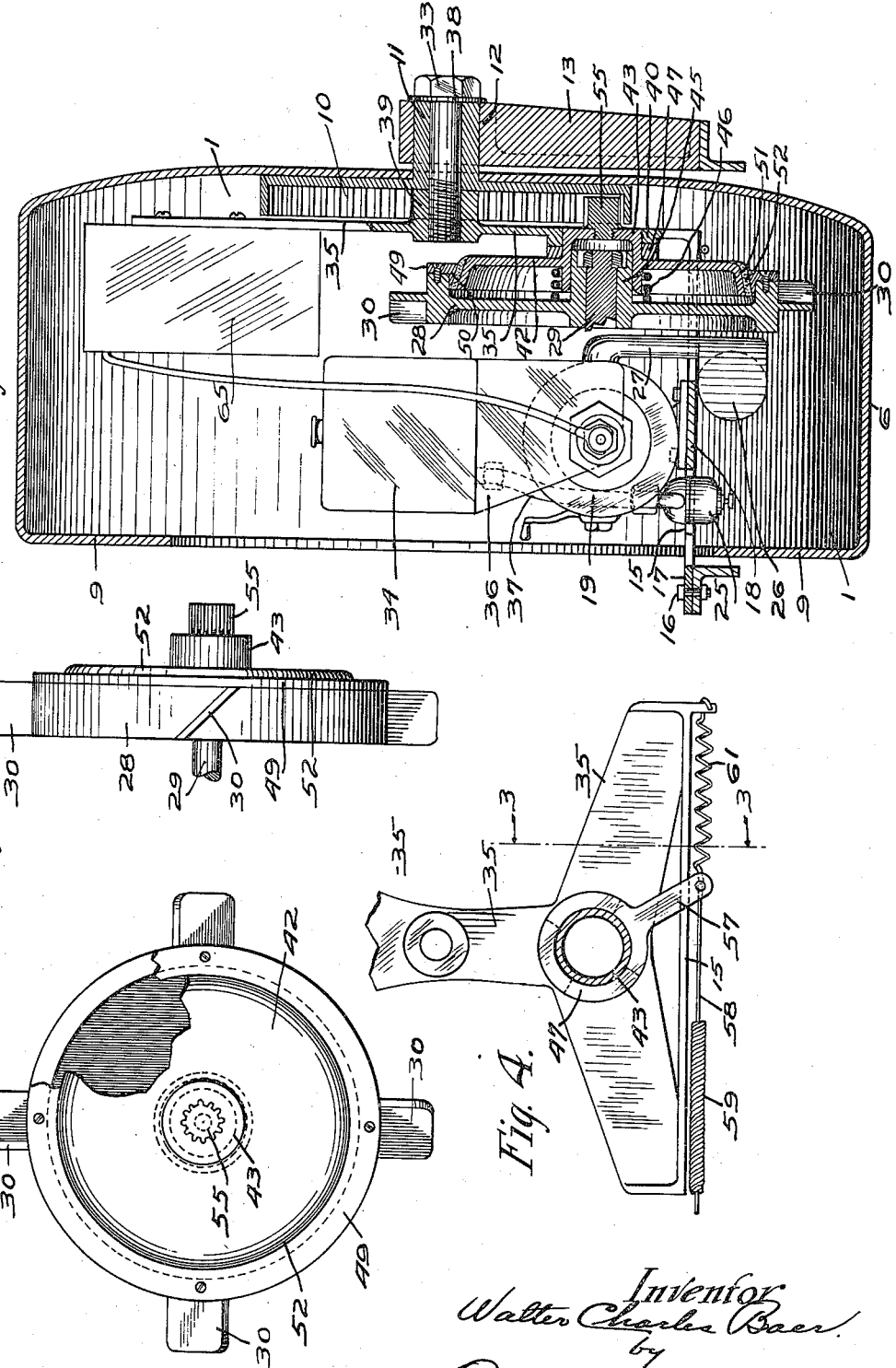

UNITED STATES PATENT OFFICE.

WALTER CHARLES BAER, OF TOLEDO, OHIO, ASSIGNOR OF ONE-HALF TO FREDERICK A. RAUCH, OF CHICAGO, ILLINOIS.

TRACTOR.

1,234,604.  Specification of Letters Patent.  Patented July 24, 1917.

Application filed March 29, 1916. Serial No. 87,445.

*To all whom it may concern:*

Be it known that I, WALTER CHARLES BAER, a citizen of the United States, and a resident of Toledo, in the county of Lucas and State of Ohio, have invented a certain new and useful Tractor; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to tractors and it particularly has for its object to provide a tractor wheel which may be removably connected to an implement or vehicle. It is particularly useful for drawing agricultural implements and vehicles of different kinds. In the particular form of the invention shown the implement or vehicle and the tractor wheel are guided by the operator walking in the vicinity of the tractor. The tractor may, however, be guided by any suitable means well known in the arts.

A further object of my invention is to provide a tractor wheel which is provided with operative means located within the tractor wheel for drawing the tractor wheel. Furthermore the tractor wheel may be so made that an engine may be contained within the tractor wheel and the parts may also be so constructed and arranged that a source of high tension current and a gasolene tank may be also mounted and contained within the tractor wheel, forming thereby a complete rotor unit all within the compass of the tractor wheel.

The invention may be contained in many forms of constructions usable for different purposes, all of which come within the purview of my claims hereinafter appended. To show the practicability of my invention I have selected one of such constructions as an example and shall describe it hereinafter. The construction selected is illustrated in the accompanying drawings.

Figure 2:
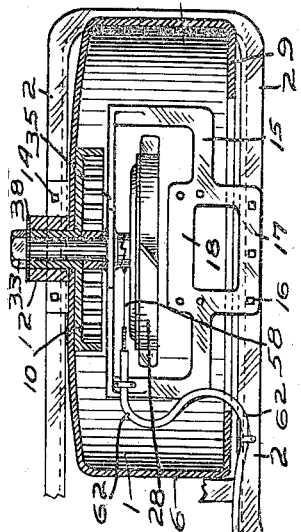
Figure 1:
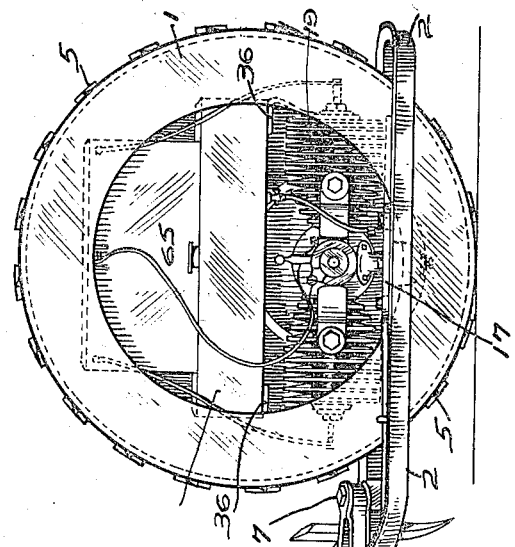
Figure 3:
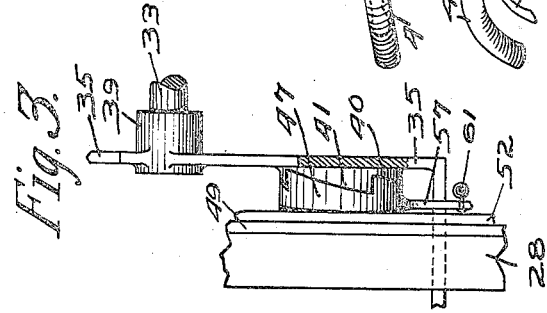

Figure 1 of the drawing illustrates a side view of the tractor and an agricultural implement such as a cultivator. Fig. 2 is a sectional view of the tractor and parts of the frame of the agricultural implement to which it is connected. Fig. 3 is an end view of the clutch mechanism partly in section taken on the line 3—3 indicated in Fig. 4. Fig. 4 is a side view of the clutch operating mechanism. Fig. 5 is a side view of the clutch and the fly wheel of the engine. Fig. 6 is an end view of the fly wheel shown in Fig. 5. Fig. 7 is a vertical axial section of the tractor and the mechanism contained therein.

1, Fig. 1, is the tractor wheel, which may be removably connected to the frame 2. The frame 2 may form a part of the agricultural implement or other vehicle to be operated by the tractor 1, or the implement or vehicle may be connected to the tractor. The frame 2 may be connected to handles 4 for the purpose of guiding the tractor and the implement. The tractor 1 may be provided with tractor bars 5 as may be desired and in a manner well known in connection with tractor wheels. The frame 2 may be connected to any suitable agricultural implement such as the cultivator 3 by means of the bolt 7. Also, if desired, the agricultural implement may be connected and braced by means of the ties 8.

The tractor wheel 1 is completely closed on one side. It is made with a broad tread 6 and on the opposite side it is provided with a broad, inwardly extending flange 9. The wheel is thus formed into a large container in which may be located operative and controlling instruments for operating and controlling the movements of the wheel 1. The inwardly extending flange 9 prevents the collection of dirt and moreover protects the engine and the parts connected to the tractor wheel 1 from the weather.

A cog wheel 10 is located within and secured to the tractor wheel. It is provided with a hub 11 which extends without the tractor wheel 1 and is journaled in the bearing 12 formed in a pedestal 13, which is bolted to the frame 2. By this means the tractor wheel is pivotally supported and connected to the frame 2 and may be disconnected from the frame 2 by unfastening the bolts 14. A frame 15 is secured by means of bolts 16 to the opposite side of the frame 2. The frame 15 is rectangular in form, the main portion of which is located within the tractor wheel 1. It is provided with a protruding portion 17 through which the bolts 16 pass to secure it to the frame 2.

It is also provided with a portion 18 which bridges the protruding portion 17 for supporting the engine 19.

The engine 19 is preferably a two cylinder horizontal engine. It is provided with the carbureter 25 which depends between the transverse portion 18 and the protruding portion 17 of the frame 15. The engine is also provided with a muffler 26 which is connected with the exhaust pipe 27, which also depends from the engine and is located below the frame 15. A fly wheel 28 is connected to the shaft 29 of the engine. The fly wheel 28 is provided with vanes 30 which are located on the periphery of the fly wheel to produce circulation of the air within the tractor wheel 1 and in the vicinity of the engine for the purpose of cooling the engine. A gasolene tank 34 is supported on brackets 36 which are secured to the ends of the engine 19. The gasolene tank is connected to the carbureter 25 by means of the pipe 37.

The frame 15 is also provided with an upwardly extending portion 35. It is provided with the boss 39 which extends within the cog wheel 10. A bolt 33 having a washer 38 is provided for securing the cog wheel 10 and the portion 35 of the frame 15 to the supporting pedestal 13 which is connected to the frame 2.

The upwardly extending portion 35 is also provided with a boss 40 which has cut therein ratchet teeth 41. A clutch member 42 is provided with a hub 43, which extends within the boss 40 and has a bearing therein. The hub 45 of the fly wheel 28 extends within the hub 43 of the clutch member 42. A spring 46 is located intermediate the fly wheel 28 and the clutch member 42, and operates to force the clutch member 42 outward and away from the fly wheel. A rotatable ratchet member 47 coacts with the ratchet 41 formed on the face or end of the boss 40 and when turned operates to push the clutch member 42 inward toward the fly wheel 28. The rim of the fly wheel 28 is provided with a ring 49 having a cone face 50 located on the inside of the ring 49 while the clutch member 42 is provided with a cone-shaped periphery 51 having secured thereto suitable clutch material such as leather 52 which coacts with the cone clutch face 50 formed on the ring 49. When the spring 46 is allowed to press the clutch member 42 outward upon being released by the ratchet member 47. When the ratchet member 47 is turned the clutch member 42 is pushed inward against the pressure of the spring 46 which releases the connection between the clutch member 42 and the fly wheel 28 and the shaft to which it is connected. The clutch member 42 is connected to the pinion 55 which meshes with the cog wheel 10 and causes rotation of the cog wheel and consequently rotation of the tractor wheel 1.

The upwardly extending portion 35 also forms a means of support for the battery box 65 and the induction coil which is used for the purposes of engine ignition in the manner well known in the art.

The ratchet member 47 is provided with an arm 57. A spring 61 is connected to the arm and to the frame 15 for pulling the arm 57 in one direction. A wire 58 is also connected to the arm 57 and passes through a tube 59. The wire 58 and the tube 59 extend through a pipe 62 which determines the location and direction of movement of the wire. The pipe is secured to the frame 2 in any suitable way. The pipe is S-shape and extends into the tractor to behind the fly wheel. The wire 58 may extend to the handles 4. It is connected to a lever 60 which, when operated, causes the arm 57 to be moved in a direction opposite to that which it is pulled by the spring 61 for the purpose of releasing the clutch member 42 from the fly wheel 28, the spring 61 operating to permit the clutch member 42 to engage with the fly wheel 28 by the operation of the spring 46.

The construction selected and described may be greatly modified in the arrangement and manufacture of its parts, and in the substitution of elements having equivalent functions, and such modifications may be used for many varied purposes and still contain the invention.

Having thus described my invention, what I claim as new and desire to secure by Letters Patent, is—

1. In a tractor, the combination of a frame, an engine supported on the frame, a tractor wheel pivotally connected to the frame surrounding the engine and having one side closed and the opposite side having an inwardly extending flange and means for connecting the tractor wheel to the engine.

2. In a tractor, the combination of a tractor wheel having one side closed and the opposite side having an inwardly extending flange, a frame extending within the tractor wheel, the tractor wheel pivotally connected to the frame, gear wheels connected to the tractor wheel, an engine and a clutch for connecting the gear wheels to the engine.

3. In a tractor, the combination of a tractor wheel having one side closed and the opposite side having an inwardly extending flange, a frame extending within the flange of the tractor wheel, a clutch member located within the wheel for connecting the engine to the tractor wheel.

4. In a tractor, the combination of a frame, a tractor wheel for containing the frame and having one side closed and the opposite side having an inwardly extending flange, a clutch member having a bearing in the frame, cog wheels supported on the frame, one of the cog wheels connected to the tractor wheel, an engine and a coacting clutch member connected to the engine.

5. In a tractor, the combination of a frame, an engine supported on the frame, a tractor wheel pivotally connected to the frame and surrounding the engine, the tractor wheel having inwardly extending members located at the sides thereof for preventing dirt from accumulating within the tractor wheel, and means for connecting the tractor wheel to the engine.

In testimony whereof, I have hereunto signed my name to this specification.

WALTER CHARLES BAER.